April 17, 1928.

E. H. PACKER

PISTON RING

Filed Nov. 3, 1926

1,666,750

INVENTOR
E.H. PACKER.
BY
ATTORNEY

Patented Apr. 17, 1928.

1,666,750

UNITED STATES PATENT OFFICE.

ELDREDGE H. PACKER, OF SAN FRANCISCO, CALIFORNIA.

PISTON RING.

Application filed November 3, 1926. Serial No. 145,923.

This invention relates to improvements in piston rings of the type disclosed in my pending application for patent for piston rings, filed February 18, 1926, Serial No. 86,768. In this type of piston ring there is provided a resilient expanding means within the hollow piston and which is provided with a series of projections extending freely through openings in the cylindrical wall of the piston and engaging and urging outward the piston ring.

The present invention resides in the provision of a simple and inexpensive means of the character described which not only yieldingly urges the piston ring laterally outward but at the same time forces the ring downward into tight engagement with the bottom of the ring groove. By forcing the ring outward, proper engagement of the ring with the cylinder is insured at all times, oil is prevented from working up past the ring, and proper compression in the engine is likewise insured. By forcing the ring downward into tight engagement with the bottom of the groove, oil is prevented from working in between the ring and bottom of the groove and passing upward around the back of the piston ring.

The means of my invention may be readily applied to a piston without necessitating the making of material changes in the construction of the latter, it only being necessary to drill or otherwise form several small openings through the cylindrical wall of the piston into a piston ring groove. Usually but one series of openings for one groove of the piston is necessary.

One of the purposes of the invention is to provide for an easy and quicker application of the invention by the use of an expanding means which includes projections that are adjustably and removably mounted on the expanding means whereby they may be readily brought into proper registry with the openings through which they extend in order to engage the piston ring.

Another purpose of the invention is to provide for the simultaneous downward and outward urging of the piston ring by the simple expediency of forming co-acting beveled faces on the projections of the expanding means and on the piston.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
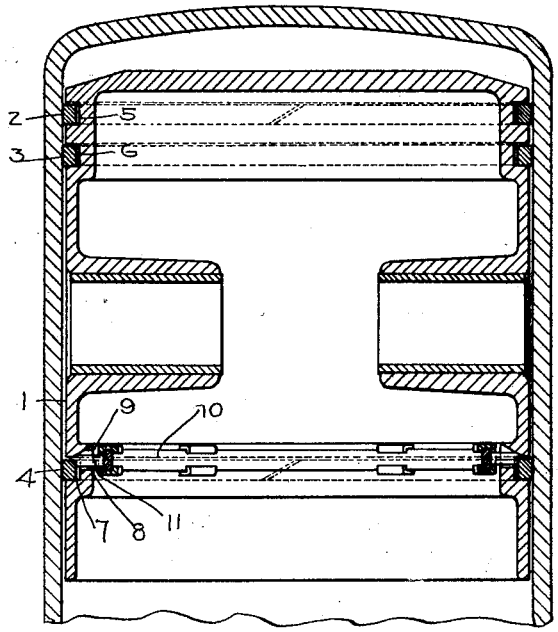
Fig. 1 represents a vertical sectional view of the piston showing the piston ring of my invention as when installed.
Figure 2:
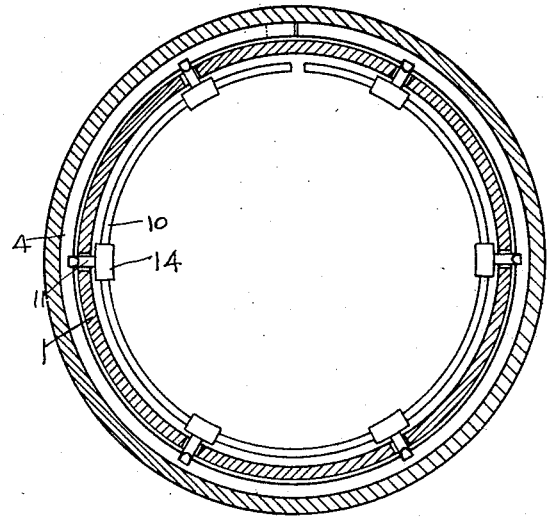
Fig. 2 represents a horizontal sectional view taken through a piston showing in top plan the expanding means for the piston ring.
Figure 3:
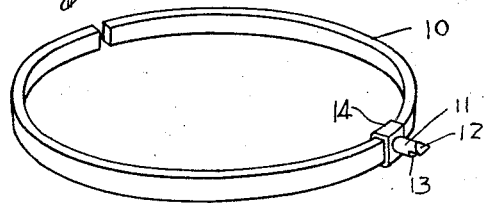
Fig. 3 represents a perspective view of the expanding ring with one of the adjustably mounted projections thereon.

The embodiment of the invention shown in the accompanying drawing comprises an ordinary hollow piston 1, provided with the usual piston rings 2, 3 and 4, mounted in grooves 5, 6 and 7 formed in the usual manner in the piston. I apply my invention to the lower ring and groove 4 and 6 respectively, although it may be applied to other rings and grooves, if desired.

The cylindrical wall of the piston at the back of the groove 7 is provided with a plurality of spaced openings 8, there being in the present instance six of such openings. The upper sides of the openings are downwardly and outwardly beveled as at 9.

I employ an expanding means inside of the piston for forcing the piston ring 4 downward and outward and in this instance said means comprises a split resilient ring 10 carrying at spaced points thereon a plurality of adjustable radial projections 11 which, when the ring 10 is mounted interiorly of the piston, may be caused to extend through the openings 8 and to engage the piston ring 4, there being a loose fit of the projections in said openings, to facilitate an easy fitting of the appliance and free action of the projections. The projections are beveled as at 12 on their upper sides at their outer ends. They are also notched on their under sides at their outer ends to form vertical shoulders 13. The beveled faces 12 on the projections engage the beveled faces 9 in the openings 8 and the shoulders 13 engage the back of the piston ring, or in other words the inner edge of the piston ring engages in the notches which form the shoulder 13.

Due to this engagement of these parts, when the projections 9 are forced outward they also move downward and the ring 4 is pushed downward and outward so that it is held in tight engagement with the groove 7 to form a tight joint at this point and to prevent the passage of oil up around the back of the piston ring.

The projections 9 may be adjustably and removably mounted on the ring 10 by means of clips 14 to which the projections may be riveted or welded as desired. The clips are adapted to slidably embrace the ring and by spreading apart the ends of the ring may be readily slipped on or off. The split ring provides for the application of an even expanding force to the piston ring and due to the special construction of the projections and openings through which they extend, the same force which tends to move the piston ring laterally outward, also moves it downward thereby holding the lower side of the piston ring against the lower side of the groove. This latter feature is advantageous in that it is a common fault in piston rings that said rings slip upward, permitting oil to pass into the groove and up around the piston ring where it may work upward into the combustion chamber. By having the piston ring expanding means inside the piston, said means is protected from damage by heat and will operate effectively over a long period of time. It will be seen that this invention may be readily, easily and cheaply applied to pistons without necessitating any material changes in the construction of the ring, it only being necessary to form the several openings 8 provided with the beveled faces 9. The mounting of the ring inside of the piston may be easily and quickly effected, it only being necessary to slightly contract the ring to bring it into proper position to align the projections 11 with the openings 8 therefor. The clips may be sufficiently tight to hold, due to frictional contact with the ring, any position of adjustment thereof, thereby facilitating proper adjustment of the projections to coincide with the holes 8 therefor.

I claim:

1. The combination wth a cylinder and a piston operating in the cylinder, the piston being provided with a piston ring groove, of a piston ring mounted in the groove, a resilient member mounted interiorily of the piston, projections extending loosely through said openings and engaging the upper side and back of the piston ring, which projecttions are forced outward by said resilient member and means providing for the downward as well as outward movement of said projections and the piston ring.

2. The combination with a cylinder and a piston operating in the cylinder, said piston being provided with a piston ring groove and with openings extending through the piston at the back of the groove, of a split resilient ring mounted interiorly of the piston, projections carried by the resilient ring extending through the openings and engaging said piston ring, said openings and the projections having co-acting beveled faces providing for downward movement of the projections simultaneously with the outward movement thereof.

3. The combination with a cylinder and a piston operating in the cylinder, said piston being provided with a piston ring groove and with openings extending through the piston at the back of the groove, of a split resilient ring mounted interiorly of the piston, projections adjustably carried by the resilient ring extending through the openings and engaging said piston ring, said openings and the projections having co-acting beveled faces providing for downward movement of the projections simultaneously with the outward movement thereof.

4. The combination with a cylinder and a piston operating in the cylinder, said piston being provided with a piston ring groove, of a piston ring in said groove, a split resilient ring mounted interiorly of the piston, projections adjustably and removably carried by the resilient ring extending through the openings and engaging said piston ring, said openings and the projections having co-acting beveled faces providing for downward movement of the projections simultaneously with the outward movement thereof.

5. The combination with a cylinder having a piston therein, the piston being provided with a piston ring groove and formed with the openings extending through the back of the groove, of a piston ring mounted within the groove, projections extending through the openings and engaging the piston ring and means causing said projections to be forced outwardly and downwardly and the piston ring to be moved correspondingly.

6. The combination with a cylinder and a piston operating therein, the piston being provided with a piston ring groove and formed with openings extending through the back of the groove, of a split resilient ring mounted interiorly of the piston, a plurality of clips removably and adjustably mounted on said resilient ring and a plurality of projections carried by the clips extending through said openings and engaging said piston ring, said openings having downwardly and outwardly beveled faces on their upper sides, there being similarly beveled faces on the upper sides of the projections cooperating with the first named beveled faces.

ELDREDGE H. PACKER.